Nov. 14, 1939.  G. W. TEMPLE  2,180,313
SLUG FEEDING MECHANISM FOR TUBE EXTRUDING PRESSES
Filed Dec. 8, 1936   2 Sheets-Sheet 1

INVENTOR
George W. Temple
BY
*Harry Jacobs*
ATTORNEY

Nov. 14, 1939.　　　G. W. TEMPLE　　　2,180,313

SLUG FEEDING MECHANISM FOR TUBE EXTRUDING PRESSES

Filed Dec. 8, 1936　　　2 Sheets-Sheet 2

INVENTOR
George W. Temple
BY
ATTORNEY

Patented Nov. 14, 1939

2,180,313

UNITED STATES PATENT OFFICE 2,180,313

SLUG FEEDING MECHANISM FOR TUBE EXTRUDING PRESSES

George W. Temple, New York, N. Y., assignor to Victor Metal Products Corporation, Brooklyn, N. Y., a corporation of New York Application December 8, 1936, Serial No. 114,757

8 Claims. (Cl. 207—1)

This invention relates to machines or presses for extruding discs or slugs of comparatively soft metal into collapsible tubes.

In the manufacture particularly of so-called nozzle tubes, that, is, collapsible tubes having an elongated neck or nozzle thereon, difficulty has heretofore been experienced, first in feeding the slugs into the female die in the proper position for the extrusion thereof by and onto the male die or plunger, and second, to withdraw the extruded tube together with the plunger from the female die without injuring the tube.

My invention therefore contemplates the provision of mechanism for suitably gripping and delivering the slug advanced from a suitable hopper, to the female die in its proper position.

My invention further contemplates the provision of means for holding the extruded tube on the male die or plunger to prevent the stripping thereof from said plunger and consequent damage to the tube when the plunger is withdrawn from the female die after the completion of the extruding operation.

The various objects of the invention will be clear from the description which follows and from the drawings, in which.

Figure 2:
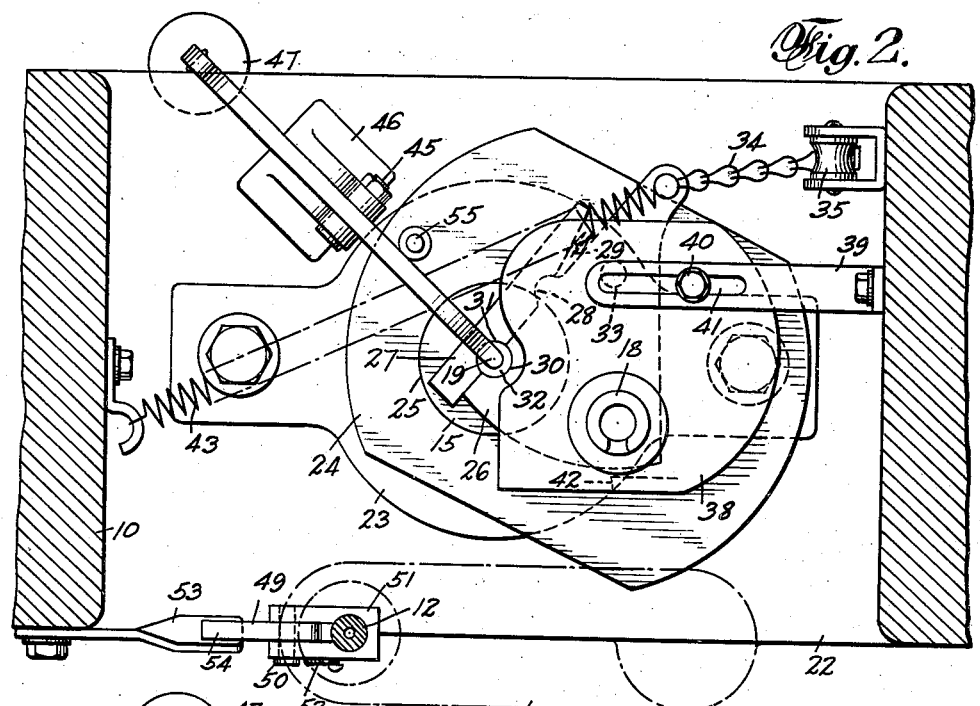
Fig. 2 is a combined top plan view and horizontal section taken on the line 2—2 of Fig. 1.

In the practical embodiment of my invention which I have shown by way of example, the various instrumentalities are mounted on the frame 10, which is provided with suitable guide grooves as 11 receiving corresponding members of the cross head 12'. The mechanism for reciprocating the cross head, being of any of the usual types employed for that purpose, need not be described nor illustrated. Carried by the reciprocating cross head is the plunger 12, terminating in a suitable elongated pin 13 and in a preferably tapered shoulder 14 adapted to enter the female die 15. The plunger or male die 12 is shown as supported by the oscillatory arm 16 for oscillatory movement from its extruding position, in which it enters the female die (Fig. 3), to the discharge position thereof (Fig. 2), in which the tube is stripped therefrom. It will be understood, however, that the plunger may be mounted in any of the other ways well known in the art. The usual air line 17 communicating with the interior of the plunger serves to supply compressed air to blow the tube off the plunger at the tube-discharge station in the customary manner.

A slug or disc is fed to the female die 15 by mechanism which removes the lowermost slug from the pile of such slugs in the hopper tube 18, while firmly gripping the slug during its transfer. When the slug is advanced to a position directly above the female die, a suitable finger 19 pushes the slug out of the slug gripping jaws and into the die in the exact position in which the slug should rest for the proper extrusion thereof into a tube by the plunger. It being noted that the metal of the slug must flow downwardly into the comparatively small but long nozzle-forming cavity 20 of the female die, as well as upwardly around the plunger during the extruding pressure thereon by the plunger during the formation of the tube, the desirabiliy of accurately positioning the slug to be extruded will be obvious. It being also noted that the tube nozzle 21 is hollow and comparatively soft and thin and hence is not adapted to withstand the blow of the usual knock-out pin customarily used to aid in withdrawing the extruded tube from the female die, the desirability of the provision of means for insuring the withdrawing movement of the plunger and tube as a unit from the female die will be understood.

With the above in mind, the description may now proceed.

Secured to the horizontal surface 22 of the frame 10 is a member as 23 for supporting the female die 15, the finger 19, the hopper 18 and various other parts later to be described. The plate 24 is provided with an opening 25 through which the female die passes and serves to support on its upper surface the slug gripping members or jaws 26 and 27. The main gripping jaw 26 is pivoted to the jaw 27 as at 28, the compression spring 29 serving to urge the front parts of the adjacent inner edges of said jaws toward each other. A preferably semi-circular recess as 30 is made in the inner edge of the jaw 26 and a corresponding recess 31 is made in the adjacent inner edge of the jaw 27, said recesses being of the proper size to receive and grip a slug as 32 therebetween.

The jaw 26 is pivotally mounted, preferably on the plate 24, as by means of the pivot 33. At the rear end of the jaw 26 is secured the chain 34, which passes about the guide pulley 35 and is connected at its upper end to the lower end of the tension spring 36, the upper end 37 of which is secured to the cross head 12'. A second spring 43 is secured at one end to the jaw 26 and at its other end to a stationary part of the machine such as the frame 10, and serves to pull the jaws in a direction opposite to the direction of the pull of the spring 36. A cover or retaining plate 38, covering the jaws 26 and 27, is suitably supported as by means of the bracket 39 secured to the frame 10. The cover plate 38 is adjustable as by means of the bolt 40 passing through the slot 41 of the bracket 39 and into the plate 24.

In the slug-receiving positions of the slug advancing jaws 26 and 27, the jaw 27 is in engagement with a suitable stop 42 of the cover plate 38, whereby the jaws are opened, said jaw 27 being slightly separated from its co-operating jaw 26 against the tension of the spring 29. The recesses 30 and 31 are thereby separated sufficiently to permit a slug from the hopper 18 to drop into said recesses and on to the plate 24. When the cross head 12' rises and consequent tension is put upon the spring 36, the chain 34 is pulled, thereby swinging the jaws 26 and 27 about the pivot 33 and away from the hopper in a clockwise direction, as viewed in Fig. 3. When the jaw 27 is withdrawn from the stop 42, the spring 29 becomes operative to swing said jaw 27 about its pivot 28 and thereby to hold the slug 32 firmly in the recesses 30 and 31. The parts are so proportioned and so designed that movement of the jaws 26 and 27 is halted when the slug becomes arranged over the cavity of the die 15, though it will be understood that if desired, a suitable stop may be arranged to stop the jaws at the desired point.

Means are provided as has been hereinbefore indicated for pushing the slug 32 downwardly into its exact required position in the female die 15. Said means comprises the oscillatory finger 19, pivotally mounted as at 45 on the bracket 46, and suitably shaped at its free end to engage the slug and at the proper time to push said slug downwardly out of the grip of the jaws and against the bottom of the larger part of the cavity of the female die, said finger passes through the recesses of the jaws and straightening the slug in the die. At its rear end, the finger 19 is provided with the chain 48 which is secured at its upper end to the cross head 12'.

It will be seen that on the upward movement of the cross head, the finger 19 is operated to lower the front end thereof and to push the slug 32 out from between the slug-gripping jaws 26 and 27 and into the female die. On the downward movement of the cross head, the weight 47 connected to the rear end of the finger 19, serves to raise the front end of said finger out of the way of the plunger or male die preparatory to the repitition of the operation. As the cross head moves down, tension on the spring 36 is released, and the spring 43 becomes operative to move the jaws into the slug receiving position thereof with the recesses 30 and 31 underneath the hopper, the stop 42 opening the jaws for a slug from the hopper to drop into said recesses. The jaw 26 is of sufficient width to retain the remaining slugs in the hopper and to prevent them from dropping on to the plate 24.

Figure 1:
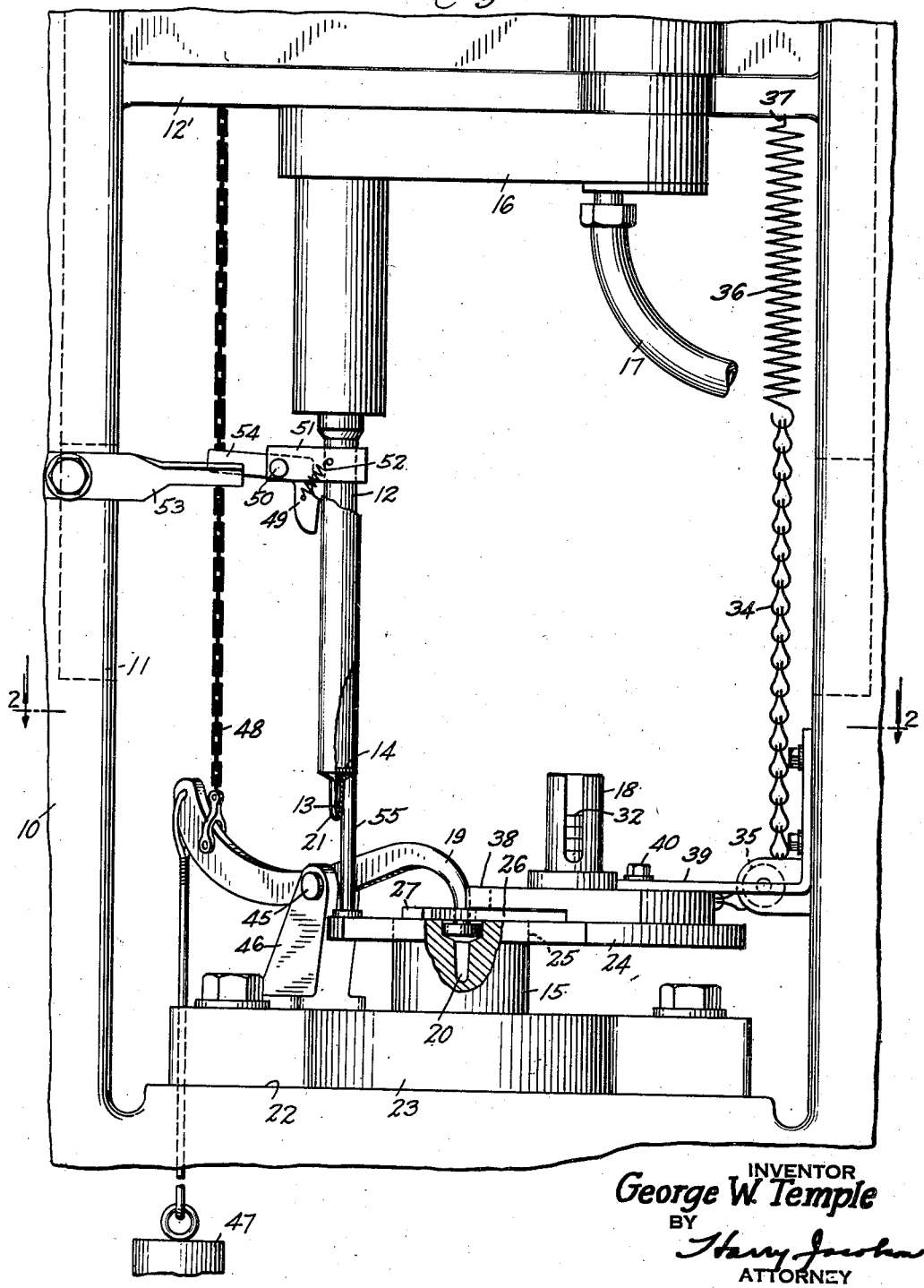
Fig. 1 is a front elevation of my improved machine.

The means for insuring the retention of the extruded tube on the plunger when the plunger is withdrawn from the female die will now be described. Said means comprises the retaining lever 49 pivoted, as by means of the bolt 50, to a suitable collar 51 secured to the upper end of the plunger 12. A spring as 52 serves to urge the lower end of said lever toward the plunger. A suitable stationary cam 53 is secured to the frame 10 in the proper position to engage the end 54 of the lever and to oscillate said lever into the position shown in Fig. 1 to release the tube on the plunger when the plunger has been swung by the arm 16 into the discharge position thereof shown in Fig. 2. Normally, however, said spring 52 serves to pull the lever into contact with the extruded tube on the plunger and to hold said tube to the plunger.

Figure 3:
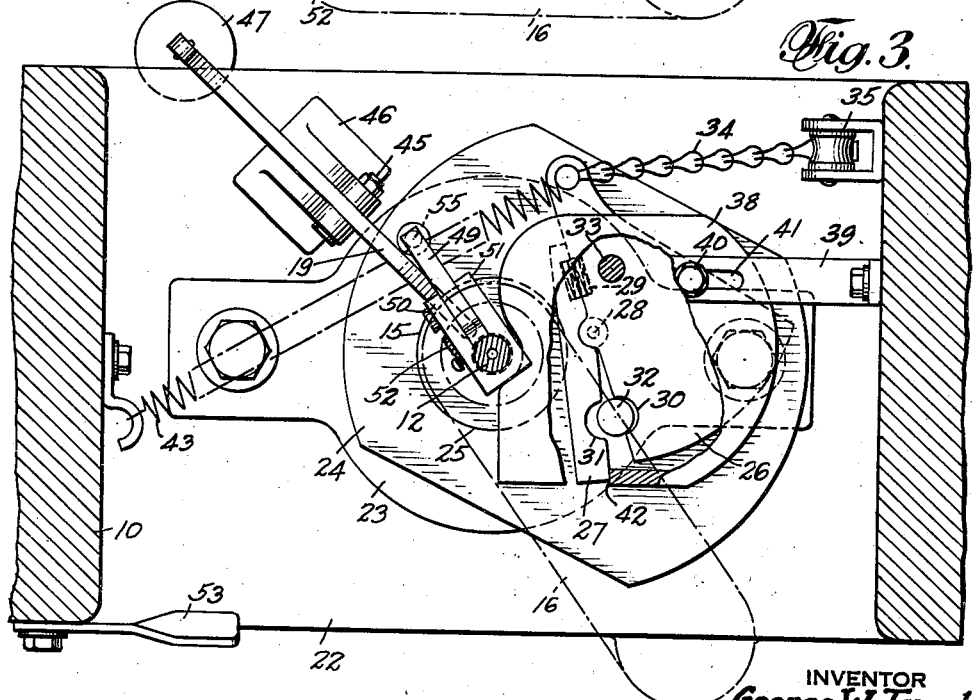
Fig. 3 is a similar view showing the positions assumed by the parts during the extruding operation.

When, however, the plunger is in the extruding position shown in Fig. 3, and is lowered into the cavity of the female die, on the last downward movement of the cross head 12', the extension 54 of the lever 49 strikes the stationary rod 55, which is supported on the plate 24. The final part of the downward movement of the cross head 12', after the end 54 of the lever has been stopped by the rod 55, causes said lever to swing about its pivot 50 against the action of the spring 52 and thereby to withdraw the lever slightly from the plunger but enough to permit the metal of the slug extruded from the die to flow about the plunger past said lever. As soon as the upward movement of the cross head 12' begins, should the frictional engagement of the tube with the walls of the die cavity be so great that the tube does not begin to leave the die, the lever end 54 is disengaged from the rod 55 permitting the spring 52 to close said lever upon the tube and thereby to hold the tube firmly upon the plunger, so that the further upward movement of the cross head pulls the tube and plunger out of the die as a unit, and without injury to the tube.

The lever 49 continues to hold the tube on to the plunger until the arm 16 is swung to carry the plunger into its discharge position, at which time the lever end 54 is swung by the cam 53 out of engagement with the tube so that the compressed air delivered by the air line 17 becomes operative to blow the tube off the plunger.

It will be understood that the movements of the parts are properly timed to deliver a slug to the female die during the upward movement of the cross head 12' and while the plunger is being carried to the discharge position thereof, the slug delivering means being moved out of the way of the plunger as the plunger is oscillated back to its extruding position.

It will further be seen that I have provided simple and efficient mechanism for accurately controlling the position of the delivery of the slug to the female die and for insuring the removal of the tube from the die with the plunger without the necessity for the use of a knock-out pin.

While I have shown and described a certain specific embodiment of my invention, I do not wish to be understood as limiting myself thereto, but desire to claim the invention as broadly as may be permitted by the state of the prior art and the scope of the appended claims.

I claim:

1. In a collapsible tube extruding press, a female die provided with a main cavity and with a greatly elongated narrower cavity communicating with the main cavity and having a closed bottom, means for feeding a slug into the main cavity, a vertically reciprocating plunger terminating in an elongated pin adapted to enter the elongated cavity, a spring-pressed tube gripping and releasing member carried by the plunger, means for operating the member to grip the tube extruded on the plunger at the beginning of the upward movement of the plunger, and means for operating the member to release the tube when the tube is to be stripped from the plunger.

2. In a collapsible tube extruding press, a plunger, a spring-pressed lever carried by and having a tube-engaging part thereof urged toward the plunger, and means for withdrawing said part from the plunger when a tube is extruded thereon and for immediately thereafter releasing said part for engagement with the tube.

3. In a collapsible tube extruding press, a tube-extruding plunger movable into a tube-extruding position and into a tube-stripping position, means for engaging a substantial uppermost part of the cylindrical surface of a tube extruded on the plunger at the tube-extruding position thereof to retain the tube on the plunger when the plunger is moved out of the tube-extruding position, and means for rendering the tube-engaging and retaining means inoperative when the plunger reaches the tube stripping position thereof to permit stripping of the tube from the plunger.

4. In a collapsible tube extruding press, tube extruding means including a movable plunger, having an elongated nozzle-forming pin at the end thereof, means for engaging and holding a tube extruded on the plunger after the pin has formed the nozzle of said tube, means for releasing the tube-holding means just before the tube is extruded on the plunger, and means for again releasing the tube-holding means when the extruded tube is to be stripped from the plunger.

5. In a collapsible tube extruding press, tube extruding means including a plunger movable from an extruding position thereof to a tube-stripping position, tube-holding means for holding an extruded tube on the plunger including a lever carried at the upper end of the plunger and having a tube-engaging end and an extension, and a spring urging said end toward the plunger, a stop for engaging the extension at the end of the tube-extruding movement of the plunger to withdraw the tube-engaging end of the lever slightly away from the plunger, said stop releasing said end at the beginning of the movement of the plunger out of the extruding position thereof, and a second stop for engaging and moving the extension in the tube-stripping position of the plunger to release the tube.

6. In a collapsible tube extruding press, tube extruding means including a vertically reciprocating plunger movable from an extruding position thereof to a tube stripping position, an elongated nozzle-forming pin at the lower end of the plunger, a tube engaging lever movable with and arranged at the upper end of the plunger, and means for operating said lever to disengage the lever from the tube at the last part of the downward tube-extruding movement of the plunger, and to release said lever to engage the extruded tube as the upward movement of the plunger is begun.

7. In a machine of the character described, means for extruding a slug into a collapsible tube including a reciprocatory plunger and a cooperating female die, means carried by the plunger for engaging the tube extruded from the slug and for holding the tube on the plunger during the movement of the plunger and the tube out of the die, and means for releasing the tube-holding means from its tube-holding position at a tube-discharge station to permit stripping of the tube from the plunger.

8. In a collapsible tube-extruding press, a tube-extruding plunger movable into tube-extruding and into tube-stripping positions, means for retaining on the plunger a tube extruded thereby when the plunger and the tube move out of the tube-extruding position and means for moving the tube-retaining means into an inoperative position and thereby to release the tube when the tube is to be stripped from the plunger.

GEORGE W. TEMPLE.